March 25, 1930.  W. J. HOSKYNS  1,751,737
VEHICLE BODY CONSTRUCTION
Filed July 26, 1926   2 Sheets-Sheet 1
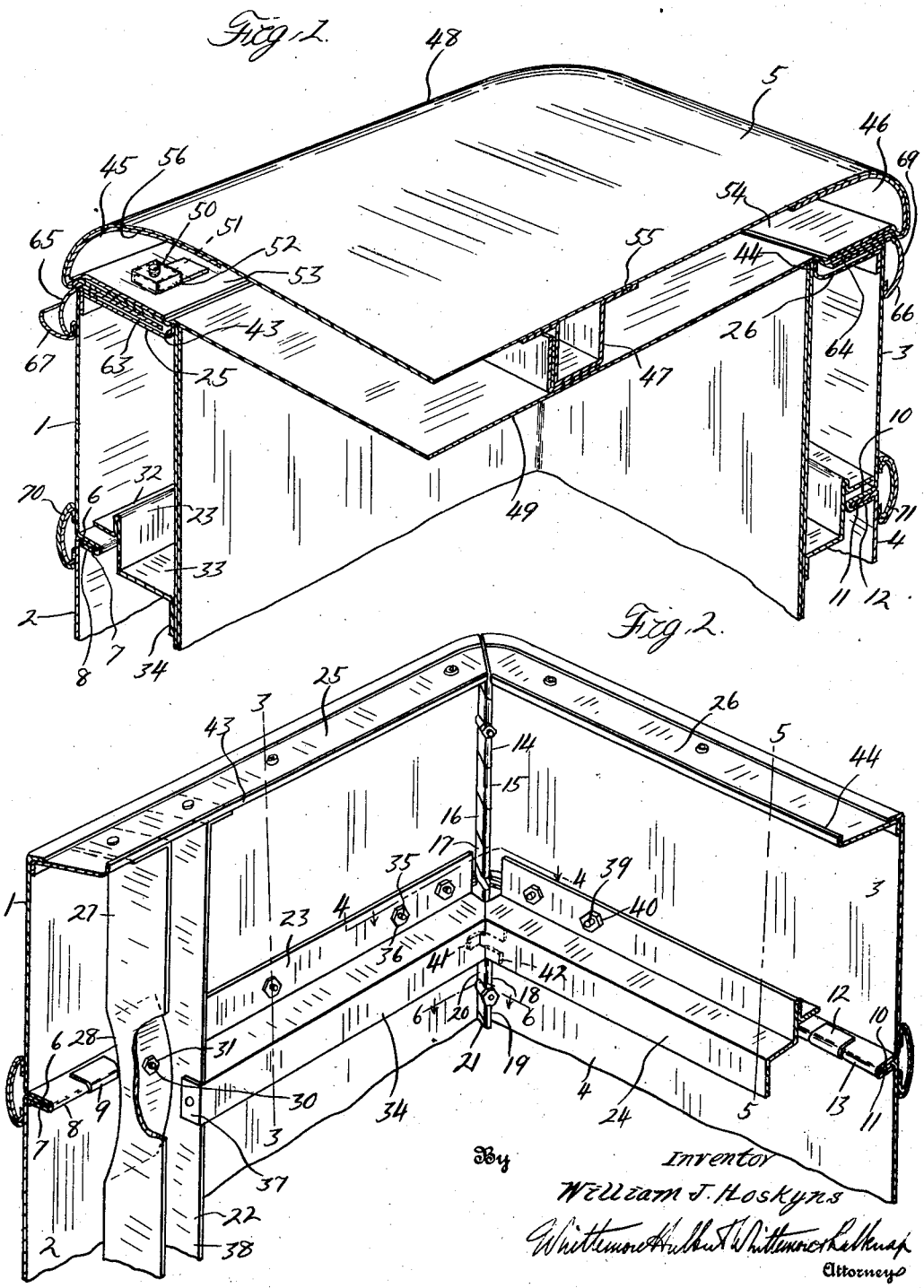
Inventor
William J. Hoskyns
By Whittemore Hulbert Whittemore Belknap
Attorneys March 25, 1930.　　　　W. J. HOSKYNS　　　　1,751,737
VEHICLE BODY CONSTRUCTION
Filed July 26, 1926　　　2 Sheets-Sheet 2
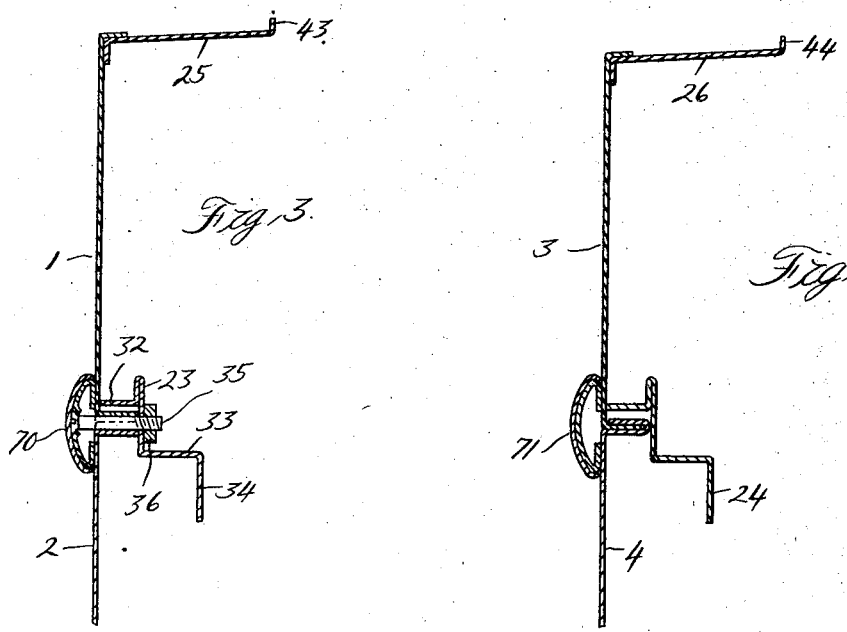
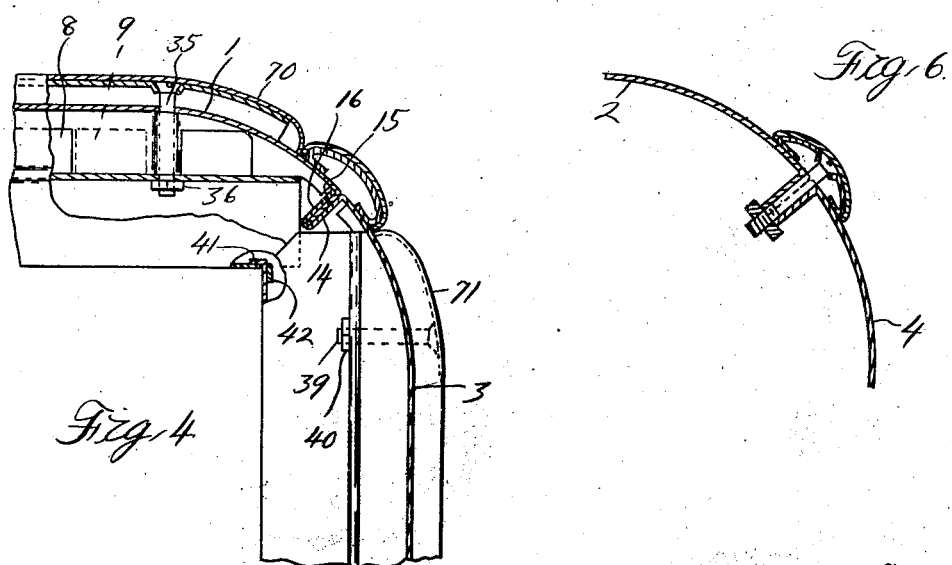
Inventor
William J. Hoskyns
By
Attorney Patented Mar. 25, 1930

1,751,737

UNITED STATES PATENT OFFICE

WILLIAM J. HOSKYNS, OF DETROIT, MICHIGAN, ASSIGNOR TO BRIGGS MANUFACTURING COMPANY, OF DETROIT, MICHIGAN, A CORPORATION OF MICHIGAN

VEHICLE BODY CONSTRUCTION

Application filed July 26, 1926. Serial No. 125,040.

This invention relates generally to vehicle body constructions and consists of certain novel features of construction, combinations and arrangements of parts as will be more fully described and particularly pointed out in the appended claims.

In the accompanying drawings:

Figure 1 is a fragmentary perspective view of a vehicle body embodying my invention.

Figure 2 is a view similar to Figure 1 with the top and side trimming material removed.

Figure 3 is a vertical sectional view taken on the line 3—3 of Figure 2.

Figure 4 is a horizontal sectional view taken on the line 4—4 of Figure 2.

Figure 5 is a vertical sectional view taken on the line 5—5 of Figure 1.

Figure 6 is a horizontal sectional view taken on the line 6—6 of Figure 2.

Referring now to the drawings, 1 and 2 respectively are upper and lower side panels, 3 and 4 respectively are upper and lower back panels and 5 is a top of a vehicle body of the closed type. As shown, the side panels 1 and 2 are arranged in the same vertical plane and are provided at their adjacent edges with inturned flanges 6 and 7 that are rigidly secured together by suitable bent over tongues 8 and 9 respectively. Likewise the upper and lower back panels 3 and 4 are arranged in a common vertical plane and are provided at their adjacent edges with inturned flanges 10 and 11 that are rigidly secured together by bent over tongues 12 and 13 respectively. To provide a rigid joint, the upper panels 1 and 3 are provided at their adjacent edges with inturned flanges 14 and 15 that are secured together by bent over tongues 16 and 17, while the lower panels 2 and 4 are provided at their adjacent edges with inturned flanges 18 and 19 that are secured together by the bent over tongues 20 and 21 respectively. To stiffen and reinforce the construction, I have provided suitable pillars 22 and metal strips 23, 24, 25 and 26 respectively. As shown, each pillar 22 is channel shape and opens inwardly, the base 27 thereof being curved longitudinally as shown at 28 to receive the joint between the flanges 6 and 7. Any suitable means such as the bolts 30 and nuts 31 may be used for securing the pillar to the panels.

The strip 23 has a lateral flange 32 that projects outwardly and overlaps the inturned flanges 6 and 7 and the tongues 8 and 9, and has a depending L-shaped rabbet portion 33 that projects inwardly so that the depending portion 34 is substantially parallel to the lower panel 2. Suitable bolts 35 and nuts 36 are preferably used to secure the strip 23 to the side panels 1 and 2. Preferably the depending flange 34 is provided at the forward end thereof with a lateral flange 37 that is riveted to the adjacent flange 38 of the pillar. The strip 24 is similar in construction to the strip 23 and is secured by bolts 39 and nuts 40 to the back panels 3 and 4 respectively. As shown, these strips 23 and 24 are connected together at their adjacent ends by suitable bent over tongues 41 and 42 respectively.

The strips 25 and 26 are preferably welded to the panels 1 and 3 respectively at the upper edges thereof and to lateral flanges 22′ at the upper end of the pillar 22 so as to support the top 5 and are provided at their inner edges with narrow upstanding flanges 43 and 44 respectively which are adapted to cooperate with suitable fasteners for supporting trimming material upon the inner side of the panels.

The top 5 which may be of the type disclosed in my co-pending application, Serial Number 125,039, filed July 26, 1926, is preferably a rigid unit and comprises the side and end rails 45 and 46, cross bows 47, rubberized fabric covering 48 and cloth lining 49. As shown, the rails 45 and 46 are preferably channel-shape and are secured by suitable bolts 50 and nuts 51 to the strips 25 and 26 respectively. In the present instance the nuts 51 are anchored in square-shaped housings 52 on the lower walls 53 and 54 respectively of the rails, while the bolts 50 extend freely through the strips 25 and 26 and threadedly engage these nuts. To provide a rigid frame for the lining 49 and covering 48 the rails 45 and 46 are preferably integrally united and the ends of the bows 47 are secured in the channels of the side rails 45. As shown, these bows 47 are channel-shape and are provided at their upper open edges with lateral flanges 55 that are welded at their opposite ends to the upper walls 56 of the side rails 45 and constitute bearings for the covering 48. If desired the lateral flanges 63 and 64 respectively of metal finish strips 65 and 66 may be held between the top 5 and strips 25 and 26. As shown, the finish strip 65 is provided with the channel-shaped portion 67 that constitutes a drip trough for receiving water draining from the top covering 48 while the strip 66 is provided with an outwardly embossed portion 69 that simulates a strip of molding corresponding to the outside molding strips 70 and 71 respectively. Preferably these molding strips 70 and 71 are held in place by the bolts 35 and 39.

Thus, from the foregoing description, it will be readily apparent that I have provided a sturdy construction that is built up of relatively few parts. For instance the arrangement of the strips 23 and 24 with respect to the joint between the panels is such that the bolts 35 and 39 respectively may be used to hold the outside molding strips 70 and 71 as well as the strips 23 and 24. In addition to materially reinforcing the construction these strips 23 and 24 as well as the strips 25 and 26 are also designed to constitute anchorage means for suitable panels of fabric trimming material (not shown). Moreover the strips 25 and 26 serve as supports for the top 5. Inasmuch as the top 5 is constructed as a unit and is secured in place by screws which are accessible from the inside, it will also be apparent that the top may be easily and quickly attached to or removed from the strips 25 and 26.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. A wall structure for vehicle bodies comprising two sheet metal panels having inturned flanges at their adjacent edges, tongues projecting from the flange of the upper panel and bent around the adjacent edge of the flange of the lower panel to a point adjacent to said lower panel, tongues projecting from the flange of the lower panel and bent around the adjacent edge of the flange of the upper panel to a point adjacent to said upper panel, a strip of molding upon the outer side of said panels concealing the joint therebetween, a reinforcing strip upon the inner side of said panels, and a connection between said strips including a part extending between the flanges aforesaid.

2. In combination, a pair of sheet metal panels having inturned flanges, tongues binding said flanges together, a strip of molding upon the outer sides of said panels, and securing means for said molding including a headed element extending between said flanges, and a nut threadedly engaging said headed element and bearing against one of said tongues.

3. In combination, a body panel, a metal strip extending longitudinally of said panel at its upper edge, a longitudinally extending flange formed on said metal strip, the said flange being welded to the upper edge of the said panel, a channel shaped upright member secured to said panel and bracing said strip, and a reinforcing strip secured to the said panel, the said reinforcing strip having a flange embracing and secured to one wall of the said channel shaped upright member.

4. In combination, a body panel, a metal strip extending longitudinally of said panel at its upper edge and secured thereto, a channel shaped upright member secured to said panel and bracing said strip, a strip of molding upon the outer side of said panel, and securing means for said molding including a headed element extending through said panel and said upright member and a nut threadedly engaging said headed element and bearing against the base of the said channel shaped upright member to secure the said upright member to the panel.

5. In combination, upper and lower substantially vertical body panels, a substantially horizontal top supporting strip extending longitudinally of and provided at its inner edge with an upstanding flange to which body trimming material may be connected, an upright member secured to said panel and supporting said strip, and a reinforcing strip secured to said panels at the meeting edges thereof and having a portion substantially parallel to said panels and constituting a bearing for the trimming material aforesaid.

6. In combination, upper and lower substantially vertical body panels having inturned flanges secured together at their adjacent longitudinal edges, an upright member constituting a body pillar having a cut-away portion receiving said inturned flanges, a reinforcing strip for said panels extending longitudinally of the inner edges of said inturned flanges and connections between said panels and upright member and reinforcing strip including means extending between said inturned flanges.

7. In combination, upper and lower substantially vertical body panels having inturned flanges secured together at their adjacent longitudinal edges, an upright member constituting a body pillar, a reinforcing strip for said panels extending longitudinally of the inner edges of said inturned flanges, connections between said panels and upright member and reinforcing strip, and the top supporting strip secured to the upper panel, projecting laterally therefrom and resting upon the upper end of said upright member.

In testimony whereof I affix my signature.

WILLIAM J. HOSKYNS.